Patented Oct. 6, 1931

1,826,696

UNITED STATES PATENT OFFICE

WILLIAM HALE CHARCH, OF BUFFALO, NEW YORK, AND KARL EDWIN PRINDLE, OF CLEVELAND, OHIO, ASSIGNORS, BY MESNE ASSIGNMENTS, TO DU PONT CELLOPHANE COMPANY, INC., OF NEW YORK, N. Y., A CORPORATION OF DELAWARE

MOISTUREPROOFING COMPOSITION

No Drawing. Original application filed January 3, 1927, Serial No. 158,816. Divided and this application filed September 27, 1928. Serial No. 308,873.

This invention relates to a composition of matter, and more particular to a composition of matter adapted not only to waterproof articles in the ordinary sense but also to moistureproof them.

Many foodstuffs and other articles are wrapped in waxed papers to maintain them in a fresh condition or state. Waxed papers are waterproof in the ordinary sense of the word and also moistureproof in varying degrees. They are, however, opaque or translucent, quite thick and brittle and crack when crumpled. Even the best of them cannot be used where flexibility and transparency as well as moistureproofness is required. We have invented a composition of matter which, when applied to transparent base materials, will not only render said base moistureproof but will not impair the transparency and flexibility of the base.

It is, therefore, an object of this invention to provide a composition of matter which may be made in thin sheets or applied as a thin coating and upon drying or setting will not only be waterproof but also moistureproof.

Another object of this invention is a composition of matter which is adapted to moistureproof various articles and which will be transparent, flexible, non-tacky and odorless.

Further objects will appear from the following description and the appended claims.

In carrying out our invention we employ a composition comprising a base, a gum or a resin, a wax or wax-like material, a solvent and with or without a plasticizer. These materials may be mixed in different proportions, depending upon the qualities required of the finished composition.

By the term "solvent" employed in this specification is meant one or more solvents for cellulose derivatives, either alone or admixed with one or more diluents to constitute what are commonly termed "solvent mixtures". It is to be understood that the solvent is of such a nature that the solid ingredients are all soluble and mutually compatible therein to form a homogeneous mixture.

For the base we prefer to use a cellulosic derivative, such as a cellulose ester, and more particularly a nitrocellulose of the pyroxylin type, because of its economy, although cellulose acetate or an ether, for example, ethyl cellulose, may be employed with satisfactory results. The base is preferably one yielding a solution of low viscosity, because this quality permits working with more highly concentrated solutions than could be used with a base yielding a solution of high viscosity.

For the gum we have found that gum dammar is very satisfactory, either singly or in combination with certain other gums. Some of the other gums that are preferably used either singly or in combination are ester gum, rosin, gum mastic, or the copal resins. It is to be understood that the gums may be either natural or synthetic, as it is possible to manufacture certain synthetic gums that are quite satisfactory substitutes for the natural ones. The term "resin" employed herein and in the claims is intended to cover gums and resins, both natural and synthetic, as above mentioned.

For the wax we prefer to use a high melting paraffin wax as giving greater resistance to moisture than the low melting paraffin. The paraffin being colorless and odorless is preferable to other waxes from these standpoints and also from the standpoint of economy. Examples of other waxes which may be used are ceresin wax, either hard or soft, and beeswax. The above waxes may be used either singly or mixed with each other or with other waxes as may be found desirable.

For the plasticizer we preferably employ one of the compounds or mixtures of compounds having a high boiling point, and which are known as "plasticizers" or "softeners" for cellulose esters or ethers such as nitrocellulose, cellulose acetate, ethyl cellulose, etc. We prefer to use a plasticizer which shall be substantially odorless and have obtained satisfactory results from using tricresyl phosphate, tri-phenyl phosphate, di-amyl phthalate or di-butyl phthalate, or castor oil.

The above ingredients, when used in the proper proportions and with a suitable solvent, give a material which, after evaporation of the solvent at an elevated temperature, is not only moistureproof, but also is flexible without cracking, is perfectly transparent, is free from greasiness or tackiness, and has the requisite tensile strength for the purposes to which it is desired that it be put.

The approximate limits may be given broadly as follows, the percentages being by weight:

Base _____ 30% to 70%
Resin _____ 30% to 60%
Wax _____ 2% to 6%
Plasticizer _____ 5% to 30%

The exact proportions of the various ingredients will vary according to the qualities desired in the finished product, and these qualities will depend upon the use to which the product is to be put. For example, if freedom from greasiness or tackiness is not essential, then the proportions and kinds of resin and wax may be varied to obtain a mixture which will be easier to make and yet will have all the desired qualities except freedom from greasiness or tackiness. By varying the proportions of the ingredients it is possible to obtain a composition with wide variations in the various qualities. By varying the quantity of wax we can obtain a wide range in the degree of resistance to moisture; by varying the quantity of, or even omitting entirely, the plasticizer all degrees of flexibility may be obtained; and by regulating the nature and quantity of the resin, wax and plasticizer a wide range in the degree of transparency may be obtained. The plasticizer may also be omitted when the so-called plasticizing or soft resins are employed as the resin component.

It is to be understood that the invention is not restricted to the precise proportions herein described, since it is apparent that the proportions of the ingredients may vary within wide limits, depending partly on the characteristics desired in the product. Hereafter there are set forth certain specific ratios of proportions of the ingredients which have been found satisfactory for producing moistureproof sheets or films of regenerated cellulose which are also characterized by being substantially perfectly transparent, flexible and non-tacky as well as having a high gloss or brilliance.

The amount of base, which is preferably a nitrocellulose of the pyroxylin type, is usually chosen with respect to the particular resin which is employed. The ratio by weight of resin to base may vary between the limits 2:1 and 1:2. When the ratio exceeds 2:1 cracking of the material may result if resins of the hard type are used. We have found that ratios within the limits of 1:1 and 1:1¾ are satisfactory for this type (hard) of resin.

The quantity of resin used depends upon the resin which is chosen, particularly with respect to its complete solubility and its ability to blend with the wax, and also the amount of base used with it. The preferred ratio of resin to base has been given above. A high ratio of hard resin to base renders the material brittle when used as a coating. A too low percentage of resin may result in a poor blending with the wax and thus a decrease of transparency and an increase in greasiness.

The wax preferably should be kept below 10% by weight of the total solids, and the best results are obtained when this percentage is kept between 2% and 6%. When the percentage approaches or exceeds 10%, crystallization of the waxes may begin, thus decreasing transparency. However, the moistureproof quality is not materially affected providing the same ratio of plasticizer to wax is retained and, therefore, a relatively large percentage of wax may be used when a relatively low degree of transparency is permissible.

The amount of plasticizer depends chiefly on the cellulose derivative and upon the degree of flexibility desired in the product. It may depend in part on the amount of wax and also upon the ratio of the amount of resin to the amount of base. When this ratio is relatively large, a greater quantity of plasticizer should be used to overcome the brittleness which is developed by the relatively large amount of resin. Moreover, the degree of moistureproofness may depend partly upon the ratio of the wax to the plasticizer and, therefore, this ratio partly determines the percentage of plasticizer employed. The ratio of plasticizer to wax may vary between the limits of 1:1 and 4:1 with good results in the way of achieving a moistureproof material.

We have discussed above the proper ratios of harder variety of resin to base and of plasticizer to wax. It now remains to discuss the preferred ratio of the combined weights of base and resin to the combined weights of wax and plasticizer. The combined weights of base and resin are usually several times greater than the combined weights of wax and plasticizer. The ratio of the weights of base and resin combined to the weights of wax and plasticizer combined may vary between the limits of about 2.3:1 and 10:1, but we find that the preferred ratio is between 4:1 and 8:1. If the ratio is less than 2.3:1 the sheet or coating will either become tacky due to the high percentage of plasticizer or will become opaque and greasy due to the high percentage of wax. When the ratio of weights of resin and base to plasticizer and wax is greater than 10:1 the sheet or coating will usually have a tendency to crack due to the small amount of plasticizer and the relatively large amount of resin, or will possess an undesirably low degree of moisture resistance due to the low amount of wax employed.

It is seen from the above that, in determining the ingredients, the nature and quantity of any one must be chosen with respect to that of all the other ingredients if we are to obtain a product which will exhibit at once all of the desirable properties already enumerated. In this matter the choice is defined by the above approximate limits, but the following examples illustrate several excellent combinations which have been employed with success. We have classed as solids the ingredients of the composition which are dissolved in a solvent for the purpose of manufacturing the finished article. While the plasticizer may appear as a liquid, nevertheless, it is non-volatile and remains in the sheet or coating after it is dry, and, therefore, for the purpose of this application and for convenience, all of the ingredients are referred to as solids.

| Solid constituent | Per cent based on total weight of solids |
|---|---|
| Example 1 | |
| Nitrocelulose | 52 |
| Ester gum | 35 |
| Di-butyl phthalate | 8.7 |
| Paraffin | 4.3 |
| Example 2 | |
| Nitrocellulose | 50 |
| Gum dammar | 34 |
| Tri-cresyl phosphate | 12 |
| Paraffin | 4 |

The above formulas are given merely as exemplary and it is to be understood that we do not consider ourselves limited thereby. Other formulas may be developed by those skilled in the art when taught by the above disclosure.

The composition is formed by mixing together the ingredients in the desired percentage which may be fixed upon for the particular purposes for which the product is to be used. The mixture is then dissolved, using preferably any well-known organic solvent which is readily volatile and will consequently evaporate rapidly. The particular solvent used is determined chiefly with reference to the method of application and to the nature and percentages of the solid ingredients. The solvent must be such as to retain all of the solid ingredients in a homogeneous solution. The wax and base ordinarily do not mix to form a clear film but by a proper choice of quality and kind of resin it has been found possible to make the combined resin and wax mix with the base and plasticizer. The solvent must then be chosen so to retain the resin, wax, base and plasticizer in their proper proportions in complete solution so that upon evaporation of the solvent a moistureproof, transparent film is formed.

It is usual to employ solvent materials for waxes up to 50% or over by weight in order to maintain the wax in solution during the process of drying of the coating or sheet. Generally speaking also, it is economical to employ relatively low percentages of intermediate boiling solvents for nitrocellulose. By employing these solvents in a proportion of 10% and under of the total solvent, we prevent too rapid drying of the coating or sheet which would cause cooling of the surrounding atmosphere and precipitation of water vapor on the material. The coating or sheet is then dried with warm air, preferably not exceeding 90° or 100° C. It is preferable to keep the temperature of the air above the melting point of the wax or waxes in the composition, thereby preventing separation or crystallization of the wax during the driving operation. It is also preferable to use air low in moisture content to aid in evaporation of the solvents. By this means it is possible to effect a very great saving in time of drying. After drying the product is preferably subjected to the action of heat and preferably a hot humidifying atmosphere, such as steam, for a short time in order more thoroughly to remove the last traces of solvents and impart or restore the flexibility to the product.

While the particular solvent must be determined separately for the particular composition, we give below the specific solvent combinations which we have found may be used with the respective examples of compositions given above.

| Solvent for Example 1 | Per cent based on total volume of solvent |
|---|---|
| Alcohol | 25 |
| Ether | 43 |
| Toluene | 18 |
| Butyl acetate | 14 |
| Solvent for Example 2 | |
| Ethyl acetate | 62 |
| Toluene | 27 |
| Alcohol | 9 |
| Butyl acetate | 2 |

The solution may be used in a variety of ways. It may be cast by known methods into thin sheets which will after treatment above described be transparent, flexible and have the required tensile strength. The composition will produce films and protective coatings several times more moistureproof than anything hitherto known that has the other qualities mentioned above. The films will have the ability to resist the transmission or diffusion of water vapor to an extent at least 3 times as great as that displayed by films of equal thickness and produced from cellulose ester lacquers heretofore formulated without admixture of waxes or wax-like materials when tested under the same conditions. It is to be understood that the value 3 merely sets forth the minimum improvement and in no wise limits the higher degrees of moistureproofing that can be obtained. The compositions, herein described, are inherently capable in many formulations prepared according to the disclosure herein set forth, of producing films showing an improvement over the prior art films of not only 3 but 10, 20, 40 and in some cases 100 fold. This is an effect which has been heretofore impossible to secure with cellulose ester lacquers formulated in the usual way with gums, resins, oils, plasticizers, etc. but without waxes or wax-like materials. These sheets or coatings may be made extremely thin, a thickness of .0003" to .001" being sufficient.

Again the solution may be applied in the form of a coating to sheets or films of regenerated cellulose hydrate from viscose, the coating being done by suitable machines. These sheets have been employed as wrappings for various substances which it is desired to protect from dust, handling by the buying public, fly specks, etc. These regenerated cellulose sheets are thin, transparent and flexible but are poorly resistant to the passage of moisture. Our composition in solution form may be applied to give a thin coating which when dry will be between .00005" and .0005" thick or thicker to one or both sides of a sheet of regenerated cellulose and, when so applied to both sides of a sheet and submitted to standard tests, it has been found that the sheet or film of regenerated celullose will yield a product which is at least 7 times as effective in resisting the transmission of moisture or water vapor therethrough as the uncoated sheets or films when tested under the same conditions. The value 7 merely indicates the minimum improvement and in nowise indicates the higher degrees of moistureproofness which can be secured. Sheets or films of regenerated cellulose coated in accordance with this invention will generally show not only 7 but 25, 50, 100 or even several hundred times the resistance to the passage of moisture or water vapor, as will the uncoated sheet when tested under the same conditions. Moreover, this result is achieved without sacrificing any of the very desirable qualities of transparency and flexibility which are possessed by the sheets of regenerated cellulose. It is well-known that a waxed paper is stiff and relatively thick as well as opaque, whereas a sheet of material constructed according to our invention or a sheet of regenerated cellulose coated with our composition is very thin, flexible and transparent as well as highly moistureproof. In practice it has been found sufficient to apply about .00010" to each side of a sheet of regenerated cellulose which usually has a thickness of .0007" to .002". Coating on one side is sufficient but we prefer to coat both sides. The resulting sheet is still very thin and the necessary transparency and flexibility are retained.

The above is merely given as an illustration of one use to which our invention may be applied. It is apparent that our composition may be used for a much wider variety of purposes than has been mentioned above. For example, it is contemplated that a solution may be employed to render moistureproof such materials as paper, leather and fabric. It may also be applied to metal to protect it from rust, because of its moistureproof qualities. It has also been found possible to impregnate with our composition individual fibers of cotton, wool, artificial silk, etc., so as to make them moistureproof. Other uses will readily suggest themselves to those skilled in the art and it is deemed necessary here only to say that our invention may be employed in general wherever a moistureproof material is desired.

One common fault of many moistureproof coatings is the fact that their surfaces are greasy. This fault is caused by the presence of wax in the coating uncombined with the other ingredients. We have succeeded in using wax in our composition and thereby making it moistureproof, but at the same time have avoided making it greasy.

The product made according to our invention is one which has all of the desired properties of moistureproofness, flexibility, tensile strength, transparency, lack of color and lack of odor. In addition the material will readily adhere to substantially any surface to which it may be desired to apply it as a coating. It may be used in very thin coatings and its value when thus employed is obvious. It will protect any article to which it is applied and at the same time will not affect the color and appearance thereof. On the other hand, if it is desired to impart color, a coloring agent, such as a pigment or a dye, may be added to the solution. The ingredients are cheap and may be easily obtained and, therefore, the product may be readily and efficiently made.

By the term "moistureproof" or its equivalent as applied to the films or protective coatings herein described, we mean the ability to resist the transmission or diffusion of moisture or water vapor to an extent at least 3 times as great as that displayed by films or coatings of equal thickness and produced from cellulose ester lacquers heretofore formulated without the admixture thereto of waxes or wax-like materials when tested under the same conditions and/or when applied to sheets or films of regenerated cellulose or other cellulosic base to yield a product which is at least 7 times as effective in resisting the transmission or diffusion of moisture therethrough as the uncoated sheets when tested under the same conditions.

It should be understood that the above definition merely sets forth the minimum improvements in moistureproofing effect which can be obtained from the invention and that the compositions are inherently capable, in many formulations according to the disclosures here set forth, of producing films showing an improvement over prior art coatings of not only 3, but 10, 20, 40, and in some cases even 100 fold. This is an effect which has not been heretofore possible to obtain with cellulose ester lacquers formulated in the usual way with gums, resins, oils, plasticizers, etc., but without waxes or wax-like materials. When applied to regenerated cellulose or other cellulosic base, a coated sheet is obtained by the invention which will readily show not only 7, but as much as 25, 50, 100, or in some cases several hundred times the resistance to the passage of moisture vapor as will the uncoated sheet when tested under the same conditions. It is therefore evident that the figures set forth in the above definition are in no wise limiting in respect to the higher degrees of moistureproofing that can be obtained.

This application is a division of application Serial No. 158,816, filed on January 3, 1927.

We claim:

1. A flowable composition comprising a cellulose derivative, a wax and a solvent in which the ingredients are soluble, the amount of wax being less than the amount of cellulose derivative and the ingredients being present in such proportions as to form a moistureproof, transparent and non-tacky film upon evaporation of the solvent at an elevated temperature.

2. A flowable composition comprising a cellulose derivative, a high melting point wax and a solvent in which the ingredients are soluble, the amount of wax being less than the amount of cellulose derivative and the ingredients being present in such proportions as to form a moistureproof, transparent and non-tacky film upon evaporation of the solvent at an elevated temperature.

3. A flowable composition comprising a cellulose derivative, paraffin wax and a solvent in which the ingredients are soluble, the amount of wax being less than the amount of cellulose derivative and the ingredients being present in such proportions as to form a moistureproof, transparent and non-tacky film upon evaporation of the solvent at an elevated temperature.

4. A flowable composition comprising a cellulose derivative, a wax, a resin and a solvent in which the ingredients are soluble, the ingredients being present in such proportions as to form a moistureproof, transparent and non-tacky film upon evaporation of the solvent at an elevated temperature.

5. A flowable composition comprising a cellulose derivative, a high melting point wax, a resin and a solvent in which the ingredients are soluble, the ingredients being present in such proportions as to form a moistureproof, transparent and non-tacky film upon evaporation of the solvent at an elevated temperature.

6. A flowable composition comprising a cellulose derivative, paraffin wax, a resin and a solvent in which the ingredients are soluble, the ingredients being present in such proportions as to form a moistureproof, transparent and non-tacky film upon evaporation of the solvent at an elevated temperature.

7. A flowable composition comprising a cellulose derivative, a wax, a resin, a plasticizer and a solvent in which the ingredients are soluble, the ingredients being present in such proportions as to form a moistureproof, transparent, non-tacky and flexible film upon evaporation of the solvent at an elevated temperature.

8. A flowable composition comprising a cellulose derivative, a high melting point wax, a resin, a plasticizer and a solvent in which the ingredients are soluble, the ingredients being present in such proportions as to form a moistureproof, transparent, non-tacky and flexible film upon evaporation of the solvent at an elevated temperature.

9. A flowable composition comprising a cellulose derivative, paraffin wax, a resin, a plasticizer and a solvent in which the ingredients are soluble, the ingredients being present in such proportions as to form a moistureproof, transparent, non-tacky and flexible film upon evaporation of the solvent at an elevated temperature.

10. A flowable composition comprising a cellulose derivative, a wax, a resin, a plasticizer and a solvent in which the ingredients are soluble, the ingredients being present in such proportions as to form a moistureproof, transparent, non-tacky and flexible film upon evaporation of the solvent at an elevated temperature, the ratio of the weight of said cellulose derivative to the weight of said resin being between 2:1 and 1:2.

11. A flowable composition comprising a cellulose derivative, a wax, a resin, a plasticizer and a solvent in which the ingredients are soluble, the ingredients being present in such proportions as to form a moistureproof, transparent, non-tacky and flexible film upon evaporation of the solvent at an elevated temperature, the percentage of wax by weight being less than 10% of the solid ingredients.

12. A flowable composition comprising a cellulose derivative, a wax, a resin, a plasticizer and a solvent in which the ingredients are soluble, the ingredients being present in such proportions as to form a moistureproof, transparent, non-tacky and flexible film upon evaporation of the solvent at an elevated temperature, the ratio of the weight of the plasticizer to the weight of the wax being between 1:1 and 4:1.

13. A flowable composition comprising a cellulose derivative, a wax, a resin, a plasticizer and a solvent in which the ingredients are soluble, the ingredients being present in such proportions as to form a moistureproof, transparent, non-tacky and flexible film upon evaporation of the solvent at an elevated temperature, the ratio of the combined weights of the resin and the cellulose derivative to the combined weights of the wax and the plasticizer being between 2.3:1 and 10:1.

14. A flowable composition comprising 30% to 70% of a cellulose derivative, 30% to 60% of a resin, 5% to 30% of a plasticizer, up to 10% of a wax, the percentages being based on the total quantity of the solid ingredients, and a sufficient quantity of a solvent to form a homogeneous mass in which the solid ingredients are present in such proportions as to form a moistureproof, transparent, flexible and non-tacky film upon evaporation of the solvent at an elevated temperature.

15. A flowable composition comprising cellulose nitrate, a wax and a solvent in which the ingredients are soluble, the amount of wax being less than the amount of cellulose nitrate and the ingredients being present in such proportions as to form a moistureproof, transparent and non-tacky film upon evaporation of the solvent at an elevated temperature.

16. A flowable composition comprising cellulose nitrate, a high melting point wax and a solvent in which the ingredients are soluble, the amount of wax being less than the amount of cellulose nitrate and the ingredients being present in such proportions as to form a moistureproof, transparent and non-tacky film upon evaporation of the solvent at an elevated temperature.

17. A flowable composition comprising cellulose nitrate, paraffin wax and a solvent in which the ingredients are soluble, the amount of wax being less than the amount of cellulose nitrate and the ingredients being present in such proportions as to form a moistureproof, transparent and non-tacky film upon evaporation of the solvent at an elevated temperature.

18. A flowable composition comprising cellulose nitrate, a wax, a resin and a solvent in which the ingredients are soluble, the ingredients being present in such proportions as to form a moistureproof, transparent and non-tacky film upon evaporation of the solvent at an elevated temperature.

19. A flowable composition comprising cellulose nitrate, a high melting point, a resin and a solvent in which the ingredients are soluble, the ingredients being present in such proportions as to form a moistureproof, transparent and non-tacky film upon evaporation of the solvent at an elevated temperature.

20. A flowable composition comprising cellulose nitrate, paraffin wax, a resin and a solvent in which the ingredients are soluble, the ingredients being present in such proportions as to form a moistureproof, transparent and non-tacky film upon evaporation of the solvent at an elevated temperature.

21. A flowable composition comprising cellulose nitrate, a wax, a resin, a plasticizer and a solvent in which the ingredients are soluble, the ingredients being present in such proportions as to form a moistureproof, transparent, non-tacky and flexible film upon evaporation of the solvent at an elevated temperature.

22. A flowable composition comprising cellulose nitrate, a high melting point wax, a resin, a plasticizer and a solvent in which the ingredients are soluble, the ingredients being present in such proportions as to form a moistureproof, transparent, non-tacky and flexible film upon evaporation of the solvent at an elevated temperature.

23. A flowable composition comprising cellulose nitrate, paraffin wax, a resin, a plasticizer and a solvent in which the ingredients are soluble, the ingredients being present in such proportions as to form a moistureproof, transparent, non-tacky and flexible film upon evaporation of the solvent at an elevated temperature.

24. A flowable composition comprising cellulose nitrate, gum dammar, paraffin wax, tri-cresyl phosphate and a solvent in which the ingredients are soluble, the ingredients being present in such proportions as to form a moistureproof, transparent, non-tacky and flexible film upon evaporation of the solvent at an elevated temperature.

25. A flowable composition comprising a cellulose derivative, a wax and a solvent in which the ingredients are soluble, the amount of wax being less than the amount of cellulose derivative and the ingredients being present in such proportions as to form a moistureproof and non-tacky film upon evaporation of the solvent at an elevated temperature.

26. A flowable composition comprising a cellulose derivative, a high melting point wax and a solvent in which the ingredients are soluble, the amount of wax being less than the amount of cellulose derivative and the ingredients being present in such proportions as to form a moistureproof and non-tacky film upon evaporation of the solvent at an elevated temperature.

27. A flowable composition comprising a cellulose derivative, paraffin wax and a solvent in which the ingredients are soluble, the amount of wax being less than the amount of cellulose derivative and the ingredients being present in such proportions as to form a moistureproof and non-tacky film upon evaporation of the solvent at an elevated temperature.

28. A flowable composition comprising a cellulose derivative, a wax, a resin and a solvent in which the ingredients are soluble, the ingredients being present in such proportions as to form a moistureproof and non-tacky film upon evaporation of the solvent at an elevated temperature.

29. A flowable composition comprising a cellulose derivative, a high melting point wax, a resin and a solvent in which the ingredients are soluble, the ingredients being present in such proportions as to form a moistureproof and non-tacky film upon evaporation of the solvent at an elevated temperature.

30. A flowable composition comprising a cellulose derivative, paraffin wax, a resin and a solvent in which the ingredients are soluble, the ingredients being present in such proportions as to form a moistureproof and non-tacky film upon evaporation of the solvent at an elevated temperature.

31. A flowable composition comprising a cellulose derivative, a wax, a resin, a plasticizer and a solvent in which the ingredients are soluble, the ingredients being present in such proportions as to form a moistureproof, non-tacky and flexible film upon evaporation of the solvent at an elevated temperature.

32. A flowable composition comprising a cellulose derivative, a high melting point wax, a resin, a plasticizer and a solvent in which the ingredients are soluble, the ingredients being present in such proportions as to form a moistureproof, non-tacky and flexible film upon evaporation of the solvent at an elevated temperature.

33. A flowable composition comprising a cellulose derivative, paraffin wax, a resin, a plasticizer and a solvent in which the ingredients are soluble, the ingredients being present in such proportions as to form a moistureproof, non-tacky and flexible film upon evaporation of the solvent at an elevated temperature.

34. A flowable composition comprising a cellulose derivative, a wax, a resin, a plasticizer and a solvent in which the ingredients are soluble, the ingredients being present in such proportions as to form a moistureproof, non-tacky and flexible film upon evaporation of the solvent at an elevated temperature, the ratio of the weight of said cellulose derivative to the weight of said resin being between 2:1 and 1:2.

35. A flowable composition comprising a cellulose derivative, a wax, a resin, a plasticizer and a solvent in which the ingredients are soluble, the ingredients being present in such proportions as to form a moistureproof, non-tacky and flexible film upon evaporation of the solvent at an elevated temeprature, the percentage of wax by weight being less than 10% of the solid ingredients.

36. A flowable composition comprising a cellulose derivative, a wax, a resin, a plasticizer and a solvent in which the ingredients are soluble, the ingredients being present in such proportions as to form a moistureproof, non-tacky and flexible film upon evaporation of the solvent at an elevated temperature, the ratio of the weight of the plasticizer to the weight of the wax being between 1:1 and 4:1.

37. A flowable composition comprising a cellulose derivative, a wax, a resin, a plasticizer and a solvent in which the ingredients are soluble, the ingredients being present in such proportions as to form a moistureproof, non-tacky and flexible film upon evaporation of the solvent at an elevated temperature, the ratio of the combined weights of the resin and the cellulose derivation to the combined weights of the wax and the plasticizer being between 2.3:1 and 10:1.

38. A flowable composition comprising 30% to 70% of a cellulose derivative, 30% to 60% of a resin, 5% to 30% of a plasticizer, up to 10% of a wax, the percentages being based on the total quantity of the solid ingredients, and a sufficient quantity of a solvent to form a homogeneous mass in which the solid ingredients are present in such proportions as to form a moistureproof, flexible and non-tacky film upon evaporation of the solvent at an elevated temperature.

39. A flowable composition comprising cellulose nitrate, a wax and a solvent in which the ingredients are soluble, the amount of wax being less than the amount of cellulose nitrate and the ingredients being present in such proportions as to form a moistureproof and non-tacky film upon evaporation of the solvent at an elevated temperature.

40. A flowable composition comprising cellulose nitrate, a high melting point wax and a solvent in which the ingredients are soluble, the amount of wax being less than the amount of cellulose nitrate and the ingredients being present in such proportions as to form a moistureproof and non-tacky film upon evaporation of the solvent at an elevated temperature.

41. A flowable composition comprising cellulose nitrate, paraffin wax and a solvent in which the ingredients are soluble, the amount of wax being less than the amount of cellulose nitrate and the ingredients being present in such proportions as to form a moistureproof and non-tacky film upon evaporation of the solvent at an elevated temperature.

42. A flowable composition comprising cellulose nitrate, a wax, a resin and a solvent in which the ingredients are soluble, the ingredients being present in such proportions as to form a moistureproof and non-tacky film upon evaporation of the solvent at an elevated temperature.

43. A flowable composition comprising cellulose nitrate, a high melting point wax, a resin and a solvent in which the ingredients are soluble, the ingredients being present in such proportions as to form a moistureproof and non-tacky film upon evaporation of the solvent at an elevated temperature.

44. A flowable composition comprising cellulose nitrate, paraffin wax, a resin and a solvent in which the ingredients are soluble, the ingredients being present in such proportions as to form a moistureproof and non-tacky film upon evaporation of the solvent at an elevated temperature.

45. A flowable composition comprising cellulose nitrate, a wax, a resin, a plasticizer and a solvent in which the ingredients are soluble, the ingredients being present in such proportions as to form a moistureproof, non-tacky and flexible film upon evaporation of the solvent at an elevated temperature.

46. A flowable composition comprising cellulose nitrate, a high melting point wax, a resin, a plasticizer and a solvent in which the ingredients are soluble, the ingredients being present in such proportions as to form a moistureproof, non-tacky and flexible film upon evaporation of the solvent at an elevated temperature.

47. A flowable composition comprising cellulose nitrate, paraffin wax, a resin, a plasticizer and a solvent in which the ingredients are soluble, the ingredients being present in such proportions as to form a moistureproof, non-tacky and flexible film upon evaporation of the solvent at an elevated temperature.

48. A flowable composition comprising cellulose nitrate, gum dammar, paraffin wax, tri-cresyl phosphate and a solvent in which the ingredients are soluble, the ingredients being present in such proportions as to form a moistureproof, non-tacky and flexible film upon evaporation of the solvent at an elevated temperature.

49. A flowable composition adapted to form a moistureproof, transparent, flexible and non-tacky film comprising nitro-cellulose—50%; gum dammar 34%; tri-cresyl phosphate—12%; and paraffin—4%.

50. A flowable composition comprising a cellulose ether, a wax and a solvent in which the ingredients are soluble, the amount of wax being less than the amount of cellulose ether and the ingredients being present in such proportions as to form a moistureproof, transparent and non-tacky film upon evaporation of the solvent at an elevated temperature.

51. A flowable composition comprising a cellulose ether, a wax, a resin and a solvent in which the ingredients are soluble, the ingredients being present in such proportions as to form a moistureproof, transparent and non-tacky film upon evaporation of the solvent at an elevated temperature.

52. A flowable composition comprising a cellulose ether, a high melting point wax, a resin, a plasticizer and a solvent in which the ingredients are soluble, the ingredients being present in such proportions as to form a moistureproof, transparent, non-tacky and flexible film upon evaporation of the solvent at an elevated temperature.

In testimony whereof, we have affixed our signatures to this specification.

WILLIAM HALE CHARCH.
KARL EDWIN PRINDLE.